United States Patent

Bosc et al.

[11] Patent Number: 5,857,039
[45] Date of Patent: Jan. 5, 1999

[54] MIXED SILICA/POLYMER ACTIVE DIRECTIONAL COUPLER, IN INTEGRATED OPTICS

[75] Inventors: Dominique Bosc, Lannion; Nicole Devoldere, Penvenan; Bertrand Loisel, Lannion, all of France

[73] Assignee: France Telecom, Paris, France

[21] Appl. No.: 813,027

[22] Filed: Mar. 6, 1997

[30] Foreign Application Priority Data

Mar. 20, 1996 [FR] France .................................. 96 03450

[51] Int. Cl.⁶ ...................................................... G02B 6/30
[52] U.S. Cl. ................................ 385/14; 385/42; 385/132

[56] References Cited

U.S. PATENT DOCUMENTS

| | | | |
|---|---|---|---|
| 4,483,583 | 11/1984 | Unger ........................................ | 385/131 |
| 4,940,328 | 7/1990 | Hartman .................................. | 356/342 |
| 5,153,934 | 10/1992 | Okayama et al. ....................... | 385/40 |
| 5,165,001 | 11/1992 | Takagi et al. ........................... | 385/42 |
| 5,247,594 | 9/1993 | Okuno et al. ............................ | 385/40 |
| 5,253,319 | 10/1993 | Bhagavatula ........................... | 385/50 |
| 5,321,782 | 6/1994 | Mugino et al. ......................... | 385/40 |
| 5,559,912 | 9/1996 | Agahi et al. ............................ | 385/42 |
| 5,659,010 | 8/1997 | Sotoyama et al. ...................... | 528/353 |

FOREIGN PATENT DOCUMENTS

| | | |
|---|---|---|
| 0 306 956 | 3/1989 | European Pat. Off. . |
| 0010205 | 1/1991 | Japan ........................................ 385/40 |

OTHER PUBLICATIONS

Patent Abstracts of Japan, vol. 017, No. 007, (P–1465), Jan. 7, 1993, JP 04 238305, Aug. 26, 1992.

Electronic Letters, vol. 30, No. 8, Apr. 14, 1994, N. Keil et al., "4×4 Polymer Thermo0Optic Directional Coupler Witch at 1.55 $\mu$M".

Applied Optics, vol. 12, No. 12, pp. 2901–2908, Dec. 1973, R. Ulrich, et al., "Measurement of Thin Film Parameters With a Prism Coupler".

The Bell System Technical Journal, vol. 48, pp. 2071–2102, Sep. 1969, E. A. J. Marcatili, "Dielectric Rectangular Waveguide and Directional Coupler for Integrated Optics".

SPIE, vol. 2449, pp. 281–292, Norbert Keil, et al., "Polymer Thermo–Optic Switching Matrix for Space–Routing in Transparent OFDM Networks"Apr., 1994.

*Primary Examiner*—John D. Lee
*Assistant Examiner*—Ellen E. Kang
*Attorney, Agent, or Firm*—Oblon, Spivak, McClelland, Maier & Neustadt, P.C.

[57] ABSTRACT

This invention relates to a directional optical coupler including at least two optical guide cores (26, 28), in silica, lying on a cladding (24) in a mineral dielectric material, and a covering layer (30) in a polymer material, which covers the two optical guide cores, and whose index is less than that of the optical guide cores.

13 Claims, 4 Drawing Sheets

MIXED SILICA/POLYMER ACTIVE DIRECTIONAL COUPLER, IN INTEGRATED OPTICS

DESCRIPTION

Technical Field

This invention relates to the field of directional couplers in integrated optics, in particular to the field of active directional couplers operating in thermo-optic mode.

The operating principle of an active directional coupler will be recapitulated with reference to FIGS. 1A and 1B in which a directional coupler 6 is represented in its two states, that is to say Cross-state (FIG. 1A) and Bar-state (FIG. 1B).

The coupler 6 includes two optical guides 8, 10 separated by a distance c on a coupling length $L_c$. The distance c is chosen sufficiently small to allow energy to pass from one guide to the other.

FIG. 1A represents the case where an optical signal introduced in a guide 1, in the extension of the guide 8 of the coupler 6, exits from the coupler by a guide 2 located in the extension of the guide 10 of the coupler 6. This is the Cross-state obtained by choosing the distance c on the length $L_c$.

In the case of FIG. 1B, an optical signal is introduced in the guide 1 and exits by the guide 4 located in the extension of the guide 8 of the coupler 6.

For a symmetrical directional coupler, the percentage of power passing from the guide 1 to the guide 4 is given by:

$P_1, 4 = \sin^2(Kz)$ where $K = \pi/(2L_c) + M\pi/L_c$, m=0, 1, 2, . . .; K is the coupling coefficient, which also depends on the propagation constant $\beta$ of the guides.

The passage from the state of FIG. 1A to that of FIG. 1B is obtained by acting on the coupling coefficient K, or the propagation constant $\beta$ of one of the guides 8, 10, or else on both guides. This action on K or on $\beta$ is carried out by means of an activator.

Directional couplers may be activated by electro-optic effect when they are constructed with highly non-linear materials such as $LiNbO_3$, or again with some polymers. This type of activation is of interest in high-speed modulation or fast switching.

Directional couplers may also be activated by thermo-optic effect. An index difference is induced by heat. This helps to provide cheaper routers when the activation speed of a coupler state has not been too high, that is to say in the range of milliseconds.

The realization of thermo-optically activated directional couplers is described, for example, in the document entitled "Polymer thermo-optic switching matrix for space-routing in transparent OFDM networks" by N. Keil et al., published in SPIE, vol. 2449, pp. 281–292 (1995). A recapitulation of the structure of a directional coupler according to this document will now be given with reference to FIG. 2. A buffer layer 14 in $SiO_x$, a layer 16 of polymer guide (BDK-PMMA) and a buffer layer 18 in Teflon lie on a silicon substrate 12. A heating element 20 is deposited on the layer 18. The operating principle of such a device is based on the dependence in temperature of the refraction index of the guide 16 in polymer material. The temperature variation coefficient of the PMMA refraction index is $-140 \times 10^{-6}/°C$. Consequently, the coupler in thermo-optic polymer has the advantage, compared to a silica coupler, of a higher index variation with regard to temperature and of a better heat confinement.

However, a guide structure entirely in polymer requires the application of a technology differing from that implemented for silica components, this technology being less tried and tested at industrial level. This is particularly the case for the step of etching a polymer layer in order to manufacture the optical guide(s) of the coupler. Moreover, the manufacture of such a structure raises problems of adapting the refraction indices of the materials when the polymer guides have to be connected to silica fibers.

Mach-Zender-based, totally silica, thermo-optic routers are also known, which said routers have a low electrical consumption. But the guides of these routers are manufactured in the suspended position so as to avoid heat losses. This is at the expense of simplicity because suspended-guide technology is both delicate and costly. In addition, there is an increase in response time which rises from 1 to 3 milliseconds, even as high as 30 milliseconds, depending on the type of suspension.

Another problem, occurring in the case of couplers made entirely in mineral material, relates to the covering of the interguide space by the mineral layer, particularly in the coupling layer. When the interguide space is "small" in relation to the dimensions of the cross-section of one or other of the guides, the guides can only be properky covered by the mineral layer, particularly in the case of silica coverings, by a so-called "FHD" technique which is extremely difficult to apply.

DISCLOSURE OF THE INVENTION

The invention seeks to solve these problems by providing a directional optical coupler including at least two optical guide cores, in silica, lying on a cladding in mineral dielectric material, and a covering layer in a polymer material, which covers the two optical guide cores, the index of this covering layer being less than that of the optical guide cores.

With the combination according to the invention of the directional coupler (silica guide and polymer covering), excellent covering of the guides is obtained, particularly in the interguide space, in the coupling zones.

Moreover, the silica may be etched in known fashion, in order to produce the guide cores, and polymer may easily be deposited on the whole.

Lastly, the structure according to the invention does not require the etching of a polymer layer: depositions of this layer are made only on silica guides where etching causes no problem.

The coupler according to the invention eliminates problems of connection between the coupler guides and the optical fibers in silica.

Furthermore, the polymer index may be such as to allow a single-mode function. This condition is of interest for applications in the telecommunications sphere.

Such a coupler may be combined with thermo-optic activation means in order to realize a thermo-optic active directional coupler.

The directional coupler according to the invention allows the good thermo-optic properties of polymers and the qualities of the guides in silica. Finally, the structure according to the invention is advantageous in that the polymers and the silica present refraction index variations of opposite tendencies with respect to temperature; thus permitting routing with smaller temperature variations and hence lower electrical currents than in devices of the prior art.

The thermo-optic activation means may include an electrode deposited on the covering layer in polymer material, for example according to one of the following three arrangements:

above the intercore space, above one only of the two guides, in asymmetric positioning, above both guides, also extending above the intercore zone, with an asymmetric positioning.

With the second and third arrangements, both the cores in silica and the optical covering cladding in polymer are heated; as the silica and polymer materials possess antagonist index variations (i.e. of opposite signs), the core-cladding index variation will be much greater than with the first arrangement.

The polymer material may belong to the following groups: polymethacrylate, α-haloacrylate, polyacrylate, polystyrene, polycarbonate, polyvinyl, polyimide, polysiloxane.

It is also possible to use a polymer mixture of these groups, or a copolymer obtained by copolymerization of at least two monomers chosen from among the base monomers of the groups listed above.

The polymer material may also be a copolymer of:

trifluoroethyl methacrylate (MATRIFE) and methyl methacrylate (MMA); the adjustment of the percentage in weight of MATRIFE in the final polymer makes it possible to adjust the index of the latter (between 1.41 and 1.49 at 632-8 nm), methyl methacrylate (MMA) and of an acrylic, methacrylic or α-haloacrylate fluoromonomer; such a fluoromonomer reduces the refraction index of the final polymer in relation to that of MMA, and increases the solubility of the final polymer in relation to that of the MMA. This increase in solubility in turn makes it possible to obtain a product which is deposited relatively easily, using a spinner, for the purpose of making thick films (thickness of the order of 10 μm).

trifluoroethyl methacrylate (MATRIFE) and a monomer allowing an index increase of the final polymer obtained, in relation to that of MATRIFE.

trifluoroethyl methacrylate and a monomer allowing the reticulation of the polymer; this displaces the vitreous transition temperature of the final polymer obtained and avoids temperature difficulties linked to the environment of the component.

BRIEF DESCRIPTION OF THE DRAWINGS

A better understanding of the characteristics and advantages of the invention will be apparent from the following description. This description relates to examples of embodiments, given for explanatory and non limitative purposes, with reference to the accompanying figures in which.

DETAILED DISCLOSURE OF EMBODIMENTS OF THE INVENTION

Figure 3:
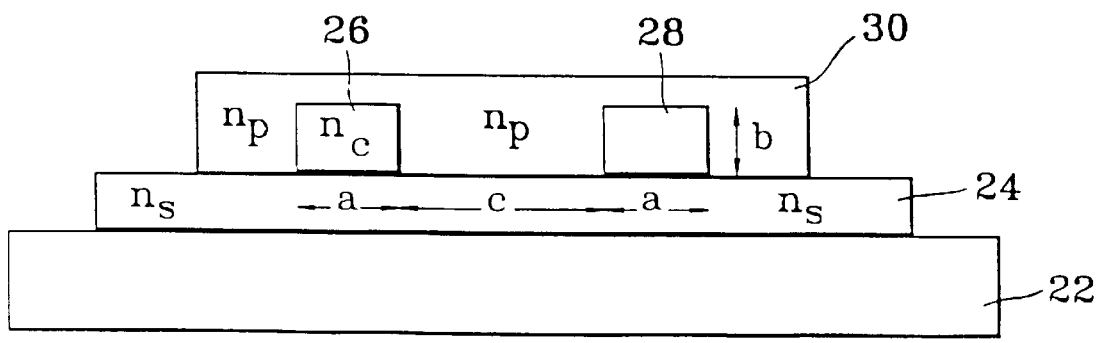
FIG. 3 represents the structure of an active directional coupler according to the invention.

FIG. 3 represents the structure of a directional coupler according to the invention. This structure includes essentially a substrate 22, for example in silicon. A layer 24 (index $n_s$), called optical cladding and in dielectric and mineral, for example silica, material, is deposited on this substrate. This layer 24 may have a thickness lying between 7 and 20 μm and fulfills the role of inner optical cladding.

References 26 and 28 each designate the core of an optical guide in silica. Each guide may, for example, have a size of 7 μm×7 μm; the two cores are separated by a coupling zone of a width c of about 2 to 6 μm. The index $n_c$ of the core of each guide depends on the silica doping. Generally, a germanium doping is chosen. Thus, at a wavelength of 1.3 μm, the following indices are given:

pure silica: $n_0 \equiv 1.447$,

2% germanium silica: $n_0 \equiv 1.452$, silica doped with 8% germanium: $n_8 \equiv 1.457$.

These values are given at $\Delta n \equiv 5.01^{-4}$ more or less.

In general, the silica doping is chosen so as to obtain a refraction index of the cores which is greater than the index of the layer 24, the variation between the two indices lying approximately between, for example, $10^{-3}$ and $10^{-2}$. These values enable the coupler to function adequately.

The two guide cores 26, 28 are covered by a covering layer 30 in polymer material. The index $n_p$ of this polymer material is less than that of the optical guide cores 26, 28. If a single-mode operation is required, a polymer whose index allows such an operation is chosen. More specifically, if $n_{p1}$ designates the index value of the polymer for which there is occurrence of a second mode, the single-mode condition is translated by the following relation:

$$n_{p1} < n_p \qquad (1)$$

In fact, $n_{p1}$ may be approximately obtained by the formula:

$$n^2_{p1} \approx n^2_c - \frac{\lambda^2}{4a^2}, \qquad (2)$$

where λ designates an operating wavelength and possesses the width of the core of an optical guide. This approximation follows from the single-mode condition:

$$0 < V = ka\sqrt{n^2_c - n^2_{p1}} < \pi, \qquad (3)$$

where k=2π/λ (propagation constant).

For example, if λ=1.3 μm, a=5 μm and $n_c$=1.451, then $n_{p1}$≡1.4451. It follows that, in this particular instance of wavelength, guide size and core index, the polymer will be of index $n_p$ lying approximately between 1.450 and 1.445.

The structure described above has several advantages.

Firstly, the use of a covering layer 30 in polymer makes it possible to cover completely the interguide in the coupling zone, located between the two cores 26 and 28. This zone is, in fact, usually fairly narrow; it may, for example, have a width lying between 2 and 6 μm. In many cases, where the guides are very high, for example of the order of the interguide distance or more, the silica deposition techniques are unable to fill the interguide completely, and in such cases this problem is resolved thanks to covering by a polymer.

Figure 1A:
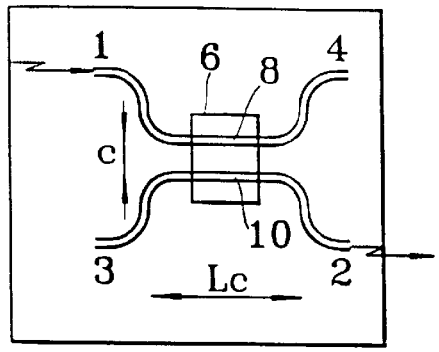
FIGS. 1A and 1B, previously described, represent in diagram form the functioning of an active directional coupler, FIG. 2, previously described, represents a thermo-optic active directional coupler structure according to the prior art.
Figure 1B:
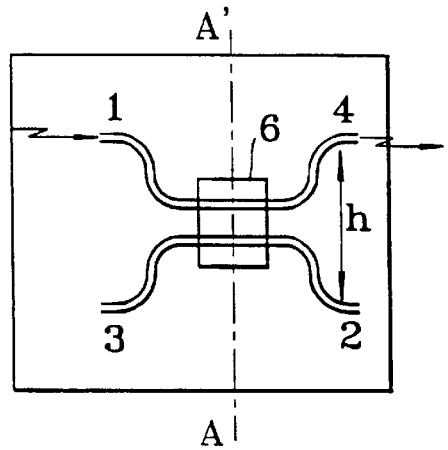
Figure 2:
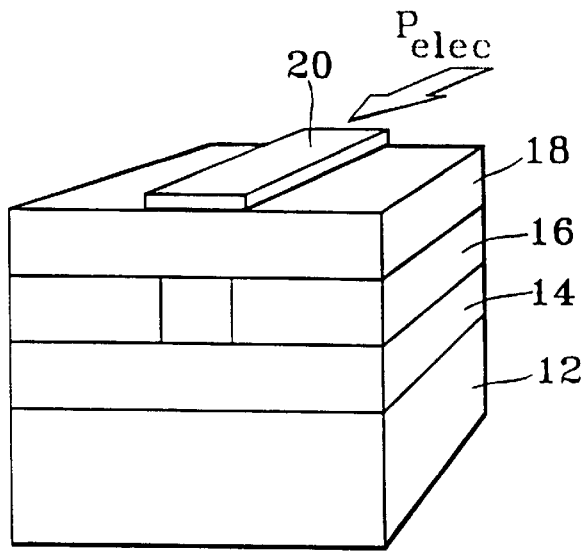

Moreover, since both the cores 26 and 28 are in silica or doped silica, their index is compatible with the index of an optical fiber in silica for transmitting luminous energy in input and output of the coupler (fibers 1, 2, 3, 4 in FIGS. 1A and 1B).

In addition, the orders of magnitude of the index variation of a polymer, under the effect of heating, lie between $5\cdot 10^{-4}$ and $7\cdot 10^{-3}$. The factor dn/dT, expressing the index differential variation in relation to the temperature differential variation, is, in the case of a polymer, of the order of $-10^{-4}$/K to $-5\cdot 10^{-4}$/K, whereas the same factor, for silica, has a value of about $10^{-5}$/K. The temperature variations necessary for switching the coupler are thus of the order of 5° to 70° C., values allowing the coupler to function with a minimum consumption, of the order of a few tens of mW.

The polymer possessing the index conditions given above may be selected from among the following groups: polymethacrylate, α-haloacrylate, polyacrylate, polystyrene, polycarbonate, polyvinyl, polyimide, polysiloxane.

A material having an adjusted index may be obtained by copolymerization of two or more monomers selected from among the groups listed above, or by mixture of polymers selected from among these same groups. A test for determining whether the mixture or the copolymer obtained has a satisfactory index consists in making a film of the material in question on a substrate, and in measuring the index by "m-lines" (this technique is described in, for example, the article by R. Ulrich & R. Torge entitled "Measurement of thin film parameters with a prism coupler", Dec. 1973/Vol 12, No. 12, pp. 2901–2908) at the wavelength of application. This technique enables the index to be measured with an accuracy of the order of $10^{-4}$ to $10^{-3}$, depending on the case.

A copolymer which may also prove suitable is a MATRIFE-MMA copolymer, that is to say trifluoroethyl methacrylate-methyl methacrylate, the mass fraction of each of them being adjusted so as to obtain the required index.

MMA may also be copolymerized with any other acrylic, methacrylic or α-haloacrylate fluoromonomer (for example, trifluorethyl α-fluoroacrylate), these fluoromonomers reducing the MMA refraction index which, at 1.49, is too high for the MMA to be used on its own. Moreover, the presence of fluorine increases the solubility of the polymer and thus makes it possible to carry out thick film depositions: this is advantageous, particularly when making a covering layer 30 so as to cores 26, 28 possessing a cross-section of about 8 μm.

MATRIFE may also be copolymerized with any other monomer selected, for example, from among the groups listed above and providing an increase in the MATRIFE index. In fact, MATRIFE possesses a very low refraction index.

Finally, it is also possible to realize a MATRIFE copolymer with other comonomers selected, for example, from among the groups listed above, allowing reticulation of the polymer. This increases the vitreous transition temperature of the polymer obtained and avoids temperature problems possibly arising from the environment of the coupler obtained.

In all cases, the "m-lines" method makes it possible to measure the index of the product obtained.

The means of coupler activation means will, for example, be thermo-optic means. This implies that the variation of the coupling coefficient K of the coupler is obtained by variation of the respective indices of the polymer and the cores, under the effect of temperature. It also means that, if the single-mode condition is imposed, the polymer then has an index $n_p$ which, at any temperature T taken in a operating range of the coupler (for example: range lying between, the ambient temperature $T_a$ (~20° C.) and the vitreous transition temperature of the polymer $T_g$, or again between $T_a$ and $T_g - 10°$ C.), satisfies the inequality (1) given above.

The thermo-optic operating mode of the coupler according to the invention is particularly advantageous inasmuch as polymers and silica possess refraction indices having opposite tendencies with regard to temperature, the result being that it is possible to carry out coupling with smaller temperature variations and thus with lower consumption of electricity.

Figure 4A:
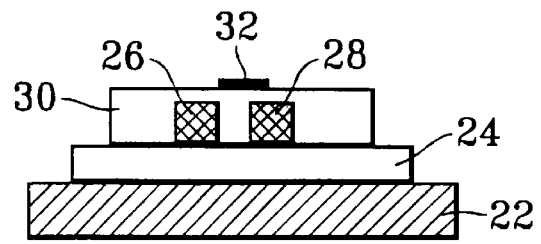
FIGS. 4A to 4C represent variants of a thermo-optic active directional coupler according to the invention.
Figure 4B:
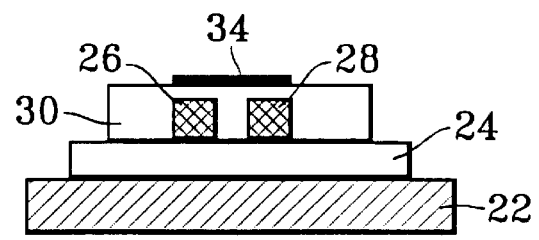
Figure 4C:
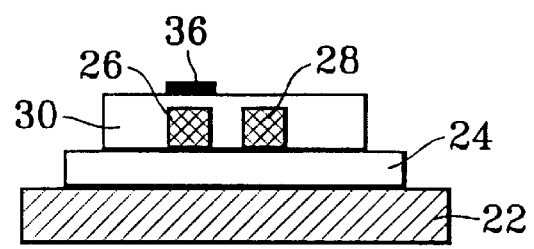

Starting with a directional coupler according to the invention, described above with reference to FIG. 3, a thermo-optic directional coupler is obtained by realizing, as illustrated in FIGS. 4A to 4C, a control electrode on the polymer layer 30. FIGS. 4A to 4C illustrate three possible positions for this electrode: it may be positioned above the intercore space (electrode 32, FIG. 4A), above the two guides 26, 28 extending also above the intercore zone (symmetrical position, electrode 34, FIG. 4B), or above one only of the two guides (symmetrical position, electrode 36, FIG. 4C).

Figure 5:
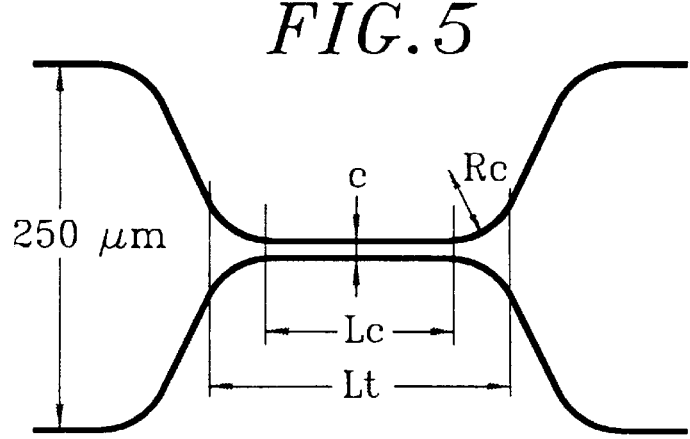
FIG. 5 represents an overhead view of the geometrical dimensions of a coupler.

There now follows a description of a method for calculating the length $L_c$ of a coupler from the data of other parameters of the said coupler and from a certain optimization criterion. This is E. A. J. Marcatili's method, as expounded in Bell Syst. Tech. J., vol. 48, pp. 2071–2102, September 1969. The initial parameters, that is to say the fixed parameters, are:

the parameters a and b on the cross-section of the cores, and the intercore distance c (see FIG. 3), the curvature radius $R_c$ of the curve portion of the coupler, the total length $L_T$ of the coupler (that is, the length $L_c$ of the linear portion + the length of the part of the zone where the guide has a curvature radius $R_c$ and where the coupling still takes place), and the gap h of the guides (chosen so that the guides no longer interact with each other); FIG. 5 illustrates the significance of these parameters, the indices $n_p$ (polymer), $n_c$ (core of the guides), $n_s$ (substrate).

For a given series of values of the parameters listed above, it is possible to calculate, by Marcatili's method, the value $L_c$ and the optical pass band to 99% (OBP for a 99% coupling rate, in Cross-state). In these particular cases, the calculation criterion chosen is the maximization of the OPB, or of the product of the coupling rate multiplied by the OBP. This criterion will be adapted to particular needs: for a coupler designed to be used on its own, the criterion concerning the OPB alone may suffice, whereas in the case of a coupler intended for use in cascade with other couplers, the coupling rate multiplied by OPB criterion will be preferred.

Table I below summarizes the results obtained for 6 cases of different couplers, each line of the table providing the parameters for one coupler. In all six cases, the following parameters are chosen as fixed:

$n_c = 1.4510$;
$n_s = 1.4472$;
$R_c = 50$ mm;
$h = 250$ μm.

All the calculations, moreover, are carried out for a wavelength $\lambda = 1.3$ μm.

The parameters $dn_p$ and $dn_c$ (columns 4 and 5 of the table) are respectively defined by:

$dn_p = n_p$ (cold) $- n_p$ (hot),
$dn_c = n_c$ (cold), where $n_p$ (cold) and $n_p$ (hot) respectively designate the cold polymer index, in other words at ambient temperature, and the hot polymer index, in other words when the coupler is activated. All these parameters are fixed according to the nature of the components (polymer nature, silica doping).

Parameter V (column 7 in the table) designates the reduced frequency, given by formula (3) above. In all cases, a check is made to ensure that the single-mode condition $V<\pi$ is satisfied.

Finally, it must be borne in mind that, for all the structures, tolerances on the interguide c and on the guide widths a are 0.15 μm, for a coupling rate of 99%.

Coefficient $A_m$, given in column 8, is a coefficient based on Marcateli's theory and permitting assessment of the satisfactory character of the method: the smaller this parameter is in relation to 1, the more the application of the method may be deemed satisfactory. In the particular cases given here, it may be seen that this parameter has a mean value, of the order of 0.5. This explains why the results obtained for $L_c$ comprise a relatively high margin of error (compared to other methods), possibly reaching 50%. It follows that this simulation method is not very rigorous and must above all be considered as a means of obtaining an order of magnitude for $L_c$. A more accurate value may subsequently be obtained by experiment, starting from this approximate value.

between these metals or other alloys of tin-lead or lead-bismuth type, for example. The thickness and the size of the electrodes are calculated so that the Joule effect is sufficient to obtain a temperature rise suitable for the operation of the coupler. This thickness is generally of the order of 0.1 μm to 1 μm or above. A uniform layer of the chosen metal, possessing the said thickness, is thus deposited. The electrodes are then marked by a wet etching process, in aqueous medium, of the said previously deposited layer. The electrodes comprise a useful zone whose surface corresponds to the surface to be heated, this useful zone being prolonged on each side by an electrical current lead circuit.

The third step of the process which has just been described consists in etching a doped silica layer in order to mark the path of the optical guides. This type of technique is tried and tested from an industrial point of view. Consequently, the realization of a coupler according to the invention is devoid of the problems encountered when realizing active directional couplers, operating in thermo-optic mode and whose guidance structure is realized entirely in polymer.

TABLE 1

| Case No. | c (μm) | a = b (μm) | $n_p$ (cold) | $dn_p$ | $dn_c$ | R (mm) | V | $A_m$ | Lc (μm) | Lt (μm) | tolerance to cold on $n_p$ | OPB at 99% (nm) |
|---|---|---|---|---|---|---|---|---|---|---|---|---|
| 1 | 3 | 5 | 1.446 | 4, 1E-3 | 5, 0E-3 | 50 | 2.54 | 0.51 | 603 | 2.392 | 3, 80E-4 | 88 |
| 2 | 3 | 5 | 1.447 | 5, 0E-3 | 4, 0E-3 | 50 | 2.54 | 0.49 | 379 | 2.168 | 3, 70E-4 | 100 |
| 3 | 3 | 6 | 1.447 | 3, 6E-3 | 4, 0E-3 | 50 | 3.04 | 0.39 | 896 | 2.685 | 3, 20E-4 | 110 |
| 4 | 3.5 | 5 | 1.447 | 3, 3E-3 | 4, 0E-3 | 50 | 2.54 | 0.49 | 582 | 2.371 | 3, 20E-4 | 114 |
| 5 | 4 | 5 | 1.447 | 2, 8E-3 | 4, 0E-3 | 50 | 2.54 | 0.49 | 827 | 2.616 | 2, 80E-4 | 129 |
| 6 | 4 | 6 | 1.447 | 2, 6E-3 | 4, 0E-3 | 50 | 3.04 | 0.39 | 1640 | 3.429 | 2, 40E-4 | 135 |

There now follows a description of a process for realizing a coupler according to the invention, with reference to FIGS. 6A to 6D.

Figure 6A:
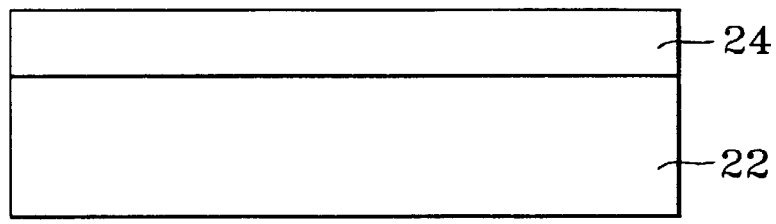
FIGS. 6A to 6D represent steps of a process of manufacture of a directional coupling according to the invention.
Figure 6B:
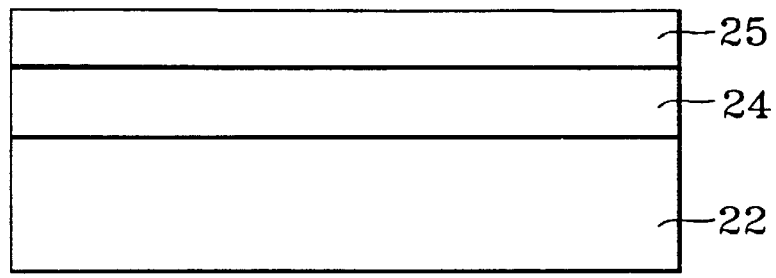
Figure 6C:
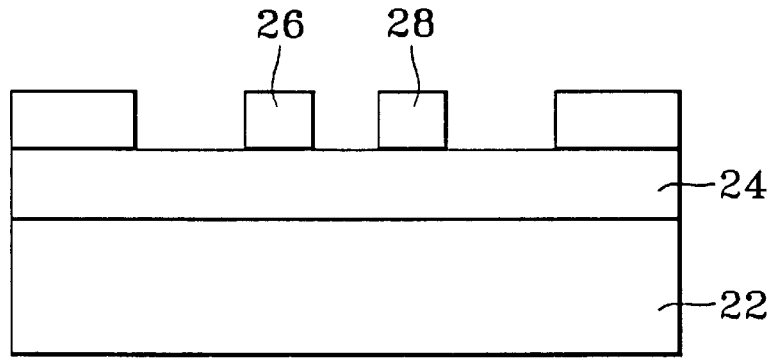

In a first step, the deposition is carried out of the cladding layer 24 in mineral dielectric material, for example in silica, on a substrate 22, for example in monocrystalline silicon (FIG. 6A). This deposition may be carried out by plasma radio frequency or microwave, from silicon hydride or chloride.

In a second step (FIG. 6B), a layer 25, in germanium doped silica, is deposited on the cladding layer 24. The technique for depositing this layer 25 is the same as that used for the layer 24.

In a third step, the layer 25 is etched. This etching marks the optical path of the cores 26, 28. The part to be etched is marked in the course of a preliminary photolithography step, this said step also protecting the core zone. The photolithography mask contains the pattern of the coupler to be produced. Following photolithography, etching is carried out by reactive ionic attack (RIE) using a fluorine gas ($C_2F_6$) or $CHF_3$. This gives the structure represented in FIG. 6C.

Figure 6D:
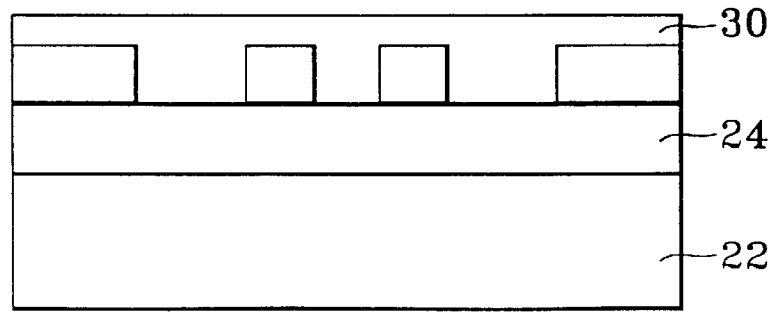

In a fourth step, the cores are covered with a polymer layer 30, prepared and selected in function of its refraction index. The polymer is preferentially deposited, using a spinner, from solutions which are sufficiently concentrated for layers of several micrometers in thickness to be obtained. In this way the structure illustrated in FIG. 6D is obtained. Other deposition techniques may be applied depending on the properties of the polymer: slow evaporation technique or serigraphy.

Finally, the metallic electrodes, such as the electrodes 32, 34, 36 in FIGS. 4A to 4C, are deposited. The electrodes may be deposited by pulverization, or sublimation, of a metal of aluminum, gold, chromium type, or of any alloy of and Moreover, the deposition step of the polymer layer 30 completely covers the entire interguide space between the cores 26 and 28, even when this space is fairly narrow in relation to the size of the guides. This makes it possible to resolve the problems raised by the known structures of the prior art, in which the covering layer is a silica layer which does not allow total filling of the interguide space.

An example will now be given of a particular embodiment of a coupler. In conformity with the process described above, the guide cores are realized in silica-on-silicon technology. A 4 inch (101,6 mm) substrate in monocrystalline silicon is prepared, on which said substrate a layer of intrinsic silica is deposited. A layer of silica doped with germanium, of a thickness of up to 8 μm, is deposited on top of this said layer of intrinsic silica. This layer has a refraction index greater than that of the inner layer and the gap is, for example, located between $10^{-3}$ and $10^{-2}$.

This layer is then etched in order to mark the critical path (third step of the process described above). In order to ensure greater selectivity of attack during etching, only 20 to 30 μm is removed around each core, thus leaving the doped layer on the periphery of the circuit.

The realization of the polymer constitutes a critical step. A methacrylic polymer is prepared, of refraction index lying between 1.44 and 1.450, at the appropriate wavelength (lying between 1.30 and 1.50 μm). This methacrylic polymer is then combined with a small fraction of a common polymer chosen from among the following groups: polymethacrylate, α-haloacrylate, polyacrylate, polystyrene, polycarbonate, polyvinyl, polyimide, polysiloxane. This is an extremely efficient and accurate method, for a polymer of exactly the required index, with a margin of $10^{-3}$, can only be synthesized directly with difficulty.

The poly (MATRIFE=trifluoroethyl methacrylate) and the PMMA methyl polymethacrylate) with refraction indices of respectively 1.41 and 1.49 in visible light, was retained. These two homopolymers are incompatible when mixed, and a MATRIFE-MMA copolymer was realized. The polymerization is without doubt of the radical type, which gives a statistic copolymer of the two monomers. This provides an index which is a weighted mean of those of the two corresponding homopolymers:

$$n_{copo} = X n_{PMMA} + (1-X) \, n_{PMAT},$$

X being the mass fraction of the PMMA, and $n_{PMMA}$ and $n_{PMAT}$ being the respective indices of the PMMA and the PMATRIFE.

The reciprocal reactivities of these monomers are not known (notably the Lewis and Mayo constant), but since their chemical formulae are very close, particularly around the active polymerization site, it may be supposed that these reactivities are relatively close, especially for concentrations of each monomer greater than 10% mass, as is the case here.

The copolymerization of a polymer with an index of 1.445 to 1.3 μm, may be carried out as follows. In a one-liter flask, the solvent THF (500 cm$^3$) is continuously mixed with the destabilized monomers, at the rate of 69% in mole of MMA, i.e. 57% in weight (for example, 28.5 g) of this monomer, and 43% (in weight) of MATRIFE (21.5 g). Promoting is ensured by AIBN (azo bis-isibutyronitril) at the rate of 1% in mole/monomer. The reaction takes place at 60° C., with reflux under argon atmosphere, for 50 hours. After this, the copolymer (CP2MA) is precipitated in absolute ethanol and dried in a vacuum oven for 24 hours at 40° C. The final yield is greater than 80%.

In order to adjust the refraction index, the CP2MA may then be mixed with a little PMMA, for example so as to bring the index up to 1.448. This copolymer possesses exceptional solubility, with solutions of 600 g/l being obtained in trichloro-1,1,2 ethane.

From these solutions, the polymer obtained is spread, using a spinner, on the substrate which also includes the silica cores.

The electrodes are then deposited by vacuum sublimation so as to obtain an aluminum film, 500 nm thick, on the coupling zone.

Figure 7:
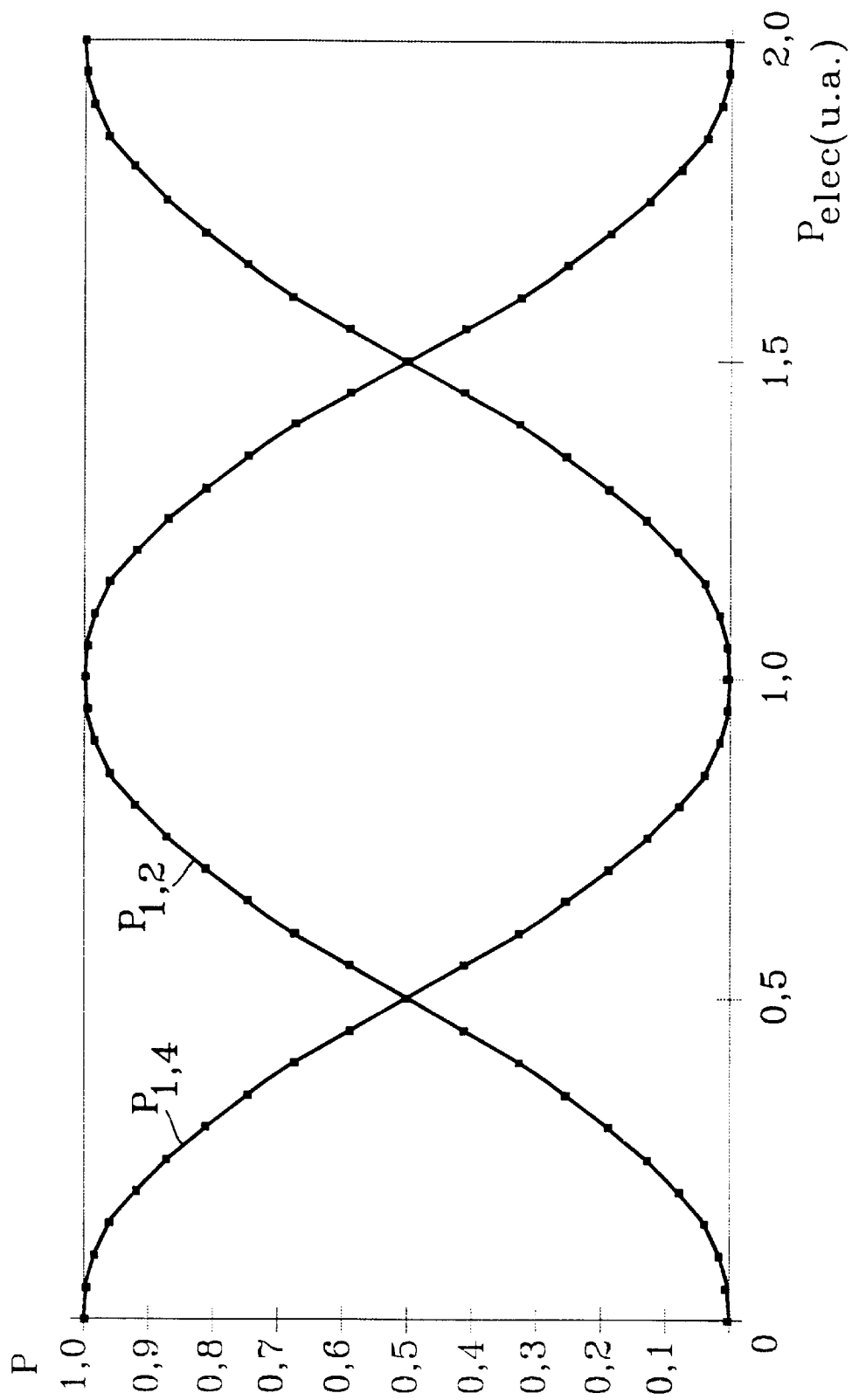
FIG. 7 illustrates the performance of a thermo-optic active directional coupler according to the invention.

FIG. 7 illustrates the performance of a coupler according to the invention. The figure represents the optical output power, on the guides 4 and 2 (see Figure 1A) in function of the electrical power $P_{elec}$ (arbitrary unit) injected in the electrodes. For a power $P_{elec}$ equal to 0, P1,4 is maximum (the coupler then operates in bar-state mode), and when $P_{elec}$=1 (arbitrary unit), $P_{1,2}$ is maximum and $P_{1,4}$ is minimum (the coupler then functions in Cross-state).

The couplers according to the invention may be applied in the telecommunications sphere, particularly in the case of single-mode couplers. Multimode couplers have applications in the manufacture of sensors.

We claim:

1. A directional optical coupler including at least two silica optical guide cores lying on a mineral dielectric cladding material, said guide cores being separated by a coupling zone, and a covering layer comprised of a polymer material having a refractive index, which covering layer completely covers the two optical guide cores, and completely fills said coupling zone, and wherein the refractive index of the polymer material is less than that of the optical guide cores.

2. The directional optical coupler according to claim 1, wherein the refractive index of said polymer material also permits a single-mode operation.

3. The directional optical coupler according to claim 1, wherein the polymer material is selected from the group consisting of polymethacrylate, α-haloacrylate, polyacrylate, polystyrene, polycarbonate, polyvinyl, polyimide, and polysiloxane.

4. The directional optical coupler according to claim 1, wherein the polymer material is selected from the group consisting of polymethacrylate, α-haloacrylate, polyacrylate, polystyrene, polycarbonate, polyvinyl, polyimide, polysiloxane, mixtures thereof and copolymers thereof.

5. The directional optical coupler according to claim 1, wherein the polymer material is a copolymer of trifluoroethyl methacrylate and methyl methacrylate.

6. The directional optical coupler according to claim 1, wherein the polymer material is a copolymer of methyl methacrylate and an acrylic, methacrylic or α-haloacrylate fluoromonomer.

7. The directional optical coupler according to claim 1, wherein the polymer material having a refractive index, is a copolymer of trifluoroethyl methacrylate and a monomer which permits an increase in said refractive index.

8. The directional optical coupler according to claim 1, wherein the polymer material is a copolymer of trifluoroethyl methacrylate and a monomer which permits the reticulation of said polymer material.

9. A directional optical coupler including at least two optical guide cores comprised of silica, lying on a cladding comprised of a mineral dielectric material, and a covering layer comprised of a polymer material having a refractive index, which covers the two optical guide cores, wherein the refractive index of the polymer material is less than that of the optical guide cores, and also including means for thermo-optic activation.

10. The directional optical coupler according to claim 9, wherein the means for thermo-optic activation includes an electrode deposited on said covering layer comprised of a polymer material.

11. The directional optical coupler according to claim 10, wherein said electrode is located above said coupling zone.

12. The directional optical coupler according to claim 10, wherein said electrode is located above only one of said at least two optical guide cores.

13. The directional optical coupler according to claim 10, wherein said electrode is located above both of said at least two optical guide cores, and also extends above said coupling zone.

* * * * *